United States Patent [19]

Frisch

[11] Patent Number: 4,966,070
[45] Date of Patent: Oct. 30, 1990

[54] DEVICE FOR THE PREPARATION OF BEVERAGES

[75] Inventor: Martin Frisch, Reichenburg, Switzerland

[73] Assignee: Nestec S.A., Vevey, Switzerland

[21] Appl. No.: 361,244

[22] Filed: Jun. 5, 1989

[30] Foreign Application Priority Data

Jun. 8, 1988 [CH] Switzerland .......................... 2177/88

[51] Int. Cl.$^5$ ........................ A47J 31/30; A47J 31/34
[52] U.S. Cl. ..................................... 99/302 R; 99/295
[58] Field of Search ................. 99/279, 280, 293, 294, 99/295, 300, 301, 302 R, 302 P, 303, 307, 308; 426/433

[56] References Cited

U.S. PATENT DOCUMENTS 3,824,914 7/1974 Casiano ............................. 99/302 R
4,583,449 4/1986 Danger ............................. 99/302 R

FOREIGN PATENT DOCUMENTS 927553 5/1963 United Kingdom ............. 99/302 R

Primary Examiner—Robert W. Jenkins
Attorney, Agent, or Firm—Vogt & O'Donnell

[57] ABSTRACT

An apparatus for preparing hot beverages includes a water reservoir, a flowmeter, a pump and a heating unit connected in series by piping. A non-return valve is positioned in an exit water outlet of the heating unit. A branch return pipe having an electro-valve positioned therein is connected to the piping between the heating unit and the pump and terminates in the reservoir.

7 Claims, 2 Drawing Sheets

DEVICE FOR THE PREPARATION OF BEVERAGES

BACKGROUND OF THE INVENTION

This invention relates to an arrangement for the preparation of beverages, more especially in a coffee machine, comprising a water reservoir connected in series to a flowmeter, to a pump, to a heating unit and to a hot water outlet opening onto the coffee to be extracted.

Coffee machines with flowmeters are known. For machines such as these, it is important—for maintaining uniformity of size of the cups of coffee produced—to have an electro-valve with a water return pipe to the main reservoir. At present, this electro-valve is situated at the outlet of the heating unit. The mode of operation is as follows: when the machine is actuated, the water arriving from the reservoir passes through the flowmeter, the pump and the heating unit and is returned through the open electro-valve to the reservoir. After a time of about 1 second, the electro-valve is closed and the flowmeter and associated electronics take into account the quantity of water passing through the flowmeter for the size of cup. Now, this positioning of the electro-valve has disadvantages, depending on the moment selected for its closure. If the electro-valve is designed to close when the water has completely filled the heating unit, all the air present in the heating unit will have been returned to the reservoir. On the other hand, the size of cup will certainly always be constant. However, since the present machine is used above all to prepare an espresso coffee, it is now known from experience that, to obtain a good espresso coffee, the extraction water has to be mixed with the air present in the heating unit which gives a coffee having an unctuous and lasting froth. If, by contrast, the electro-valve is designed to close before the water has completely filled the heating unit, a mixture of air and water will effectively be obtained but since, in this case, the exact moment of arrival of the water in the heating unit will not be known, there will be no uniformity in the size of cup during successive extractions.

SUMMARY OF THE INVENTION

The arrangement according to the present invention enables the disadvantages mentioned above to be obviated while, at the same time, always ensuring thorough mixing of air and water in the heating unit and uniformity in the size of cup for different extractions.

The present invention relates to an arrangement for the preparation of beverages, more particularly in a coffee machine, having a water reservoir connected in series to a flowmeter, to a pump, to a heating unit and to a hot water outlet opening onto the coffee to be extracted, comprising an electro-valve with a water return pipe to the reservoir branched between the heating unit and the pump and a non-return valve arranged at the exit of the heating unit.

The presence of the electro-valve before the heating unit enables all the pipes from the reservoir to before the heating unit to be completely filled with water in a constant manner for all the extractions before closure of the electro-valve. The pump comprises a non-return valve to ensure that the water actually returns to the reservoir through the branch.

DETAILED DESCRIPTION OF THE INVENTION

The arrangement according to the invention may be used for the extraction of any type of coffee and, in particular, for the preparation of espresso coffee from the cartridges according to Swiss patent No. 605 293. The flowmeter used is of the type normally used in coffee machines. It is preferred to use a bladed flowmeter of the type described in Swiss patent application no. 2721/87-1.

This heating unit is either a linear coil, as shown in the drawing, or a circular coil.

The function of the non-return valve at the exit of the heating unit is, on the one hand, to prevent the return of coffee during extraction and, on the other hand, when the electro-valve is open, to prevent air from leaving the heating unit so that water does not enter the heating unit. The non-return valve is of the spring type with shutter.

BRIEF DESCRIPTION OF THE DRAWING

The arrangement and mode of operation according to the invention is described in more detail with reference to the accompanying drawings.

DETAILED DESCRIPTION OF THE DRAWING

Figure 1:
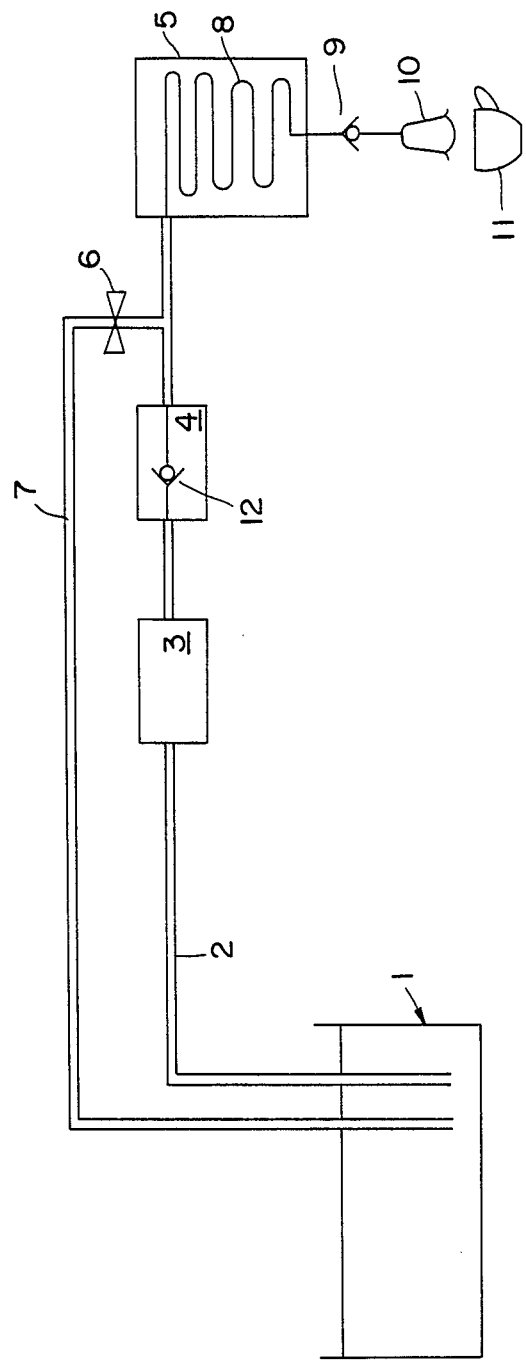
FIG. 1 provides a schematic depiction of the elements of the present invention.

The water reservoir (1) is connected by a pipe (2) to the flowmeter (3), to the pump (4) and to the heating unit (5). Arranged between the heating unit (5) and the pump (4) is an electro-valve (6) with a pipe (7) returning to and terminating in the reservoir (1). The heating unit (5) is of the linear coil (8) type and a non-return valve (9) is situated at its exit. The valve (9) is preset to open at a predetermined water pressure, for example the order of 2 atms., to present the permanent flow of water. The cartridge (10) according to Swiss patent No. 605 293 is used for the extraction of coffee. The coffee is collected in the container (11). The non-return valve (12) of the pump is of the same type as that at the exit of the heating unit.

Figure 2:
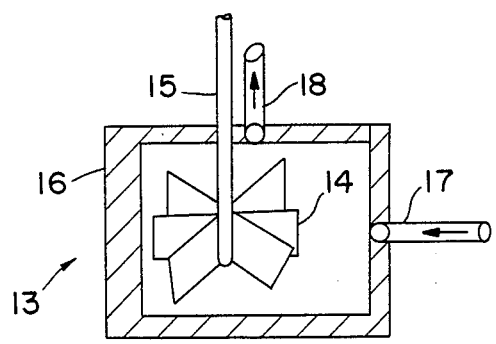
FIG. 2 illustrates a bladed flowmeter.

FIG. 2 illustrates a bladed flowmeter 13 of the type described in Swiss Patent application No. 2721/87-1 in which a plurality of measuring blades 14 are mounted upon a vertical axle 15 contained in housing 16. Liquid enters through inlet 17 of the housing perpendicularly to the vertical axle 14 and axis of rotation of the axle and leaves the flowmeter housing though outlet pipe 18.

Figure 3:
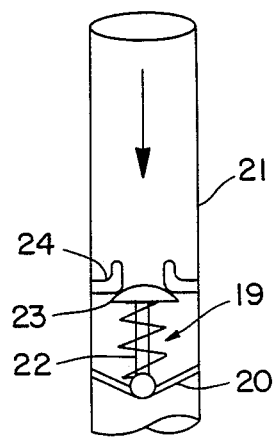
FIG. 3 illustrates a spring valve having a shutter.

FIG. 3 illustrates a spring valve having a shutter arranged in a pipe, the direction of liquid flow in the pipe being designated by an arrow. Spring 19, seated upon supports 20 positioned within pipe 21, surrounds valve stem 22 and extends to valve closure 23. In a closed position, valve closure 23 mates with valve seat 24.

The arrangement operates as follows:

When the machine is actuated, the pump (4) starts up and pumps the water to the electro-valve (6). The electro-valve is open so that the water returns to the reservoir (1) through the presence of the non-return valve (12) and the pressure of the air in the heating unit prevents the heating unit from filling due to the closure of the valve (9). The impulses of the flowmeter are not taken into account by the associated electronics for the size of cup. When the flowmeter detects a constant through flow of water, the electro-valve is fed and closes. The impulses of the flowmeter are counted, the water fills the heating unit and when its pressure is sufficient in the heating unit, it opens the valve (9) and passes through the cartridge (10) and the prepared beverage is collected.

The delay in the closure of the electro-valve enables all the pipes between the flowmeter, the pump and the electro-valve to be filled. This ensures a more constant measure of coffee and affords the possibility of using the air present in the heating unit for extraction. The flowmeter is of course programmed for a particular size of cup.

I claim:

1. An apparatus for supplying and heating a quantity of water for preparing beverages comprising:
   a water reservoir which is connected, in series by piping, to a flowmeter, which is connected by the piping to a pump, which is connected by the piping to a heating unit;
   a non-return valve positioned in an exit water outlet of the heating unit;
   a branch return pipe connected to the piping between the heating unit and the pump and terminating in the reservoir; and
   an electro-valve positioned in the return pipe.

2. An apparatus according to claim 1 further comprising a non-return valve associated with the pump connection to the piping.

3. An apparatus according to claim 1 or 2 wherein the flowmeter is a bladed flowmeter.

4. An apparatus according to claim 1 or 2 wherein the heating unit is a linear coil heating unit.

5. An apparatus according to claim 1 or 2 wherein the heating unit is a circular coil heating unit.

6. An apparatus according to claim 2 wherein the pump non-return valve is a spring valve having a shutter.

7. An apparatus according to claim 1 wherein the heating unit non-return valve is a spring valve having a shutter.

* * * * *